US012743039B2

(12) United States Patent
Harada

(10) Patent No.: US 12,743,039 B2
(45) Date of Patent: Sep. 22, 2026

(54) DEVELOPING DEVICE INCLUDING SPIRAL BLADE FOR CONVEYING DEVELOPER WHILE ROTATING AND IMAGE FORMING APPARATUS

(71) Applicant: KYOCERA Document Solutions Inc., Osaka (JP)

(72) Inventor: Yuzo Harada, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/965,672

(22) Filed: Dec. 2, 2024

(65) Prior Publication Data

US 2025/0181008 A1 Jun. 5, 2025

(30) Foreign Application Priority Data

Dec. 4, 2023 (JP) ................................ 2023-204789

(51) Int. Cl.
*G03G 15/08* (2006.01)
*G03G 21/10* (2006.01)
*G03G 21/12* (2006.01)

(52) U.S. Cl.
CPC ..... *G03G 15/0812* (2013.01); *G03G 15/0844* (2013.01); *G03G 15/0891* (2013.01);
(Continued)

(58) Field of Classification Search
CPC ........... G03G 15/0812; G03G 15/0891; G03G 21/12; G03G 2215/0827;
(Continued)

(56) References Cited

U.S. PATENT DOCUMENTS

2004/0265009 A1* 12/2004 Shigeta .............. G03G 15/0853 399/254
2010/0239322 A1* 9/2010 Kido .................. G03G 15/0808 399/284
(Continued)

FOREIGN PATENT DOCUMENTS

JP 2011-128527 A 6/2011
JP 2015-102572 A 6/2015

OTHER PUBLICATIONS

The extended European search report issued by the European Patent Office on May 9, 2025 , which corresponds to European Patent Application No. 24216743.5-1001 and is related to U.S. Appl. No. 18/965,672.

*Primary Examiner* — Stephanie E Bloss
*Assistant Examiner* — Laura Roth
(74) *Attorney, Agent, or Firm* — Studebaker Brackett PLLC

(57) ABSTRACT

A developing device includes a housing, a replenishment port, a spiral blade, a discharge port, and a regulating member. The housing houses a developer. Through the replenishment port, the developer is replenished to the housing. The spiral blade stirs the developer in the housing while conveying the developer in a predetermined conveyance direction. Through the discharge port, the developer conveyed by the spiral blade is discharged. The regulating member is disposed between the spiral blade and the discharge port, and regulates a conveyance of the developer to the discharge port. The regulating member has a lack portion penetrating in the conveyance direction.

3 Claims, 6 Drawing Sheets

(52) U.S. Cl.
CPC ........... *G03G 21/105* (2013.01); *G03G 21/12* (2013.01); *G03G 2215/0822* (2013.01); *G03G 2215/0827* (2013.01); *G03G 2215/083* (2013.01)

(58) Field of Classification Search
CPC ....... G03G 2215/0822; G03G 15/0893; G03G 15/0844; G03G 21/105; G03G 2215/083; G03G 2215/0833
See application file for complete search history.

(56) References Cited

U.S. PATENT DOCUMENTS

| | | | | |
|---|---|---|---|---|
| 2011/0150537 | A1 | 6/2011 | Watanabe et al. | |
| 2015/0139696 | A1 | 5/2015 | Ishida et al. | |
| 2015/0139697 | A1 | 5/2015 | Tsukijima et al. | |
| 2016/0139542 | A1 * | 5/2016 | Furukawa .......... | G03G 15/0893 399/256 |
| 2016/0370732 | A1 * | 12/2016 | Sasaki ................ | G03G 15/0844 |
| 2016/0370734 | A1 | 12/2016 | Suenami | |

* cited by examiner

DEVELOPING DEVICE INCLUDING SPIRAL BLADE FOR CONVEYING DEVELOPER WHILE ROTATING AND IMAGE FORMING APPARATUS

INCORPORATION BY REFERENCE

This application is based on and claims the benefit of priority from Japanese patent application No. 2023-204789 filed on Dec. 4, 2023, which is incorporated by reference in its entirety.

BACKGROUND

The present disclosure relates to a developing device and an image forming apparatus.

An electrophotographic image forming apparatus includes a developing device which develops an electrostatic latent image formed on a photosensitive drum by using toner. The developing device using a two-component developer containing toner and carrier is provided with a developing housing which stores the developer, a developing roller which supplies the toner to the photosensitive drum, and a stirring member which conveys the developer to the developing roller while stirring the developer. In this configuration, while the toner is consumed by the developing, the carrier remains in the developing housing, so that as the developing operation is repeated, the carrier deteriorates to decrease a frictional charging ability with respect to the toner. Therefore, there is known a configuration in which a predetermined amount of the carrier is continuously replaced by replenishing the developer and discharging the excessive developer. For example, there is a configuration in which a regulating member is provided to block the developer conveyed by the stirring member, and the developer got over the regulating member is discharged through a discharge port.

The developing device must be designed according to a processing speed required for the image forming apparatus. For example, comparing a high-speed machine with a low-speed machine, the high-speed machine requires a larger amount of the developer supplied per unit time and a larger amount of the excessive developer discharged per unit time. When the above-described configuration is adopted, in order to vary a discharge amount of the excessive developer, it is necessary to vary specifications (number of turns, pitch, diameter, and the others) of the stirring member, but a size of the housing also needs to be varied, so that there is a problem that a size of the housing increases as the speed increases. Further, there is a problem that changing the size of the housing causes an increase in cost.

SUMMARY

A developing device according to the present disclosure includes a housing, a replenishment port, a spiral blade, a discharge port, and a regulating member. The housing houses a developer. Through the replenishment port, the developer is replenished to the housing. The spiral blade stirs the developer in the housing while conveying the developer in a predetermined conveyance direction. Through the discharge port, the developer conveyed by the spiral blade is discharged. The regulating member is disposed between the spiral blade and the discharge port, and regulates a conveyance of the developer to the discharge port. The regulating member has a lack portion penetrating in the conveyance direction.

An image forming apparatus according to the present disclosure includes a photosensitive drum on which an electrostatic latent image is formed, and the developing device which supplies the developer to the photosensitive drum.

The above and other objects, features, and advantages of the present disclosure will become more apparent from the following description when taken in conjunction with the accompanying drawings in which a preferred embodiment of the present disclosure is shown by way of illustrative example.

BRIEF DESCRIPTION OF THE DISCLOSURE

Hereinafter, with reference to the drawings, a developing device 14 and an image forming apparatus 100 according to one embodiment of the present disclosure will be described.

Figure 1:
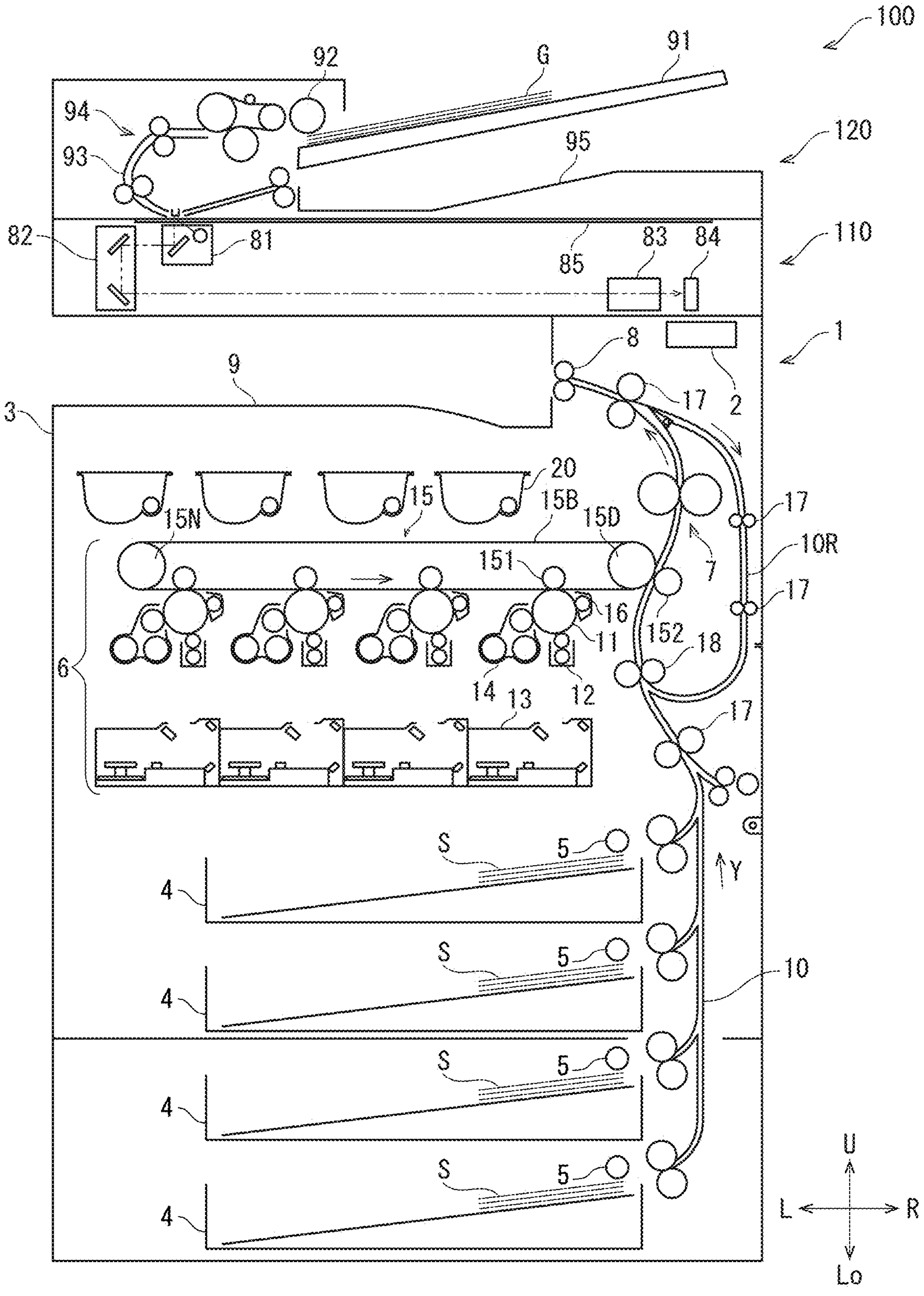
FIG. 1 is a front view schematically showing an internal configuration of an image forming apparatus according to one embodiment of the present disclosure.

First, the entire configuration of the image forming apparatus 100 will be described. FIG. 1 is a front view schematically showing an internal configuration of the image forming apparatus 100. Hereinafter, the front side of the paper plane on which FIG. 1 is drawn is defined as the front side of the image forming apparatus 100, and the left-and-right direction is described with reference to the direction in which the image forming apparatus 100 is viewed from the front side. In each drawing, U, Lo, L, R, Fr, and Rr indicate the upper, lower, left, right, front, and rear, respectively.

The image forming apparatus 100 includes a printer 1, a scanner 110, and a document conveying device 120. The scanner 110 is provided above the printer 1, and the document conveying device 120 is provided above the scanner 110. The document conveying device 120 conveys a document via a reading position of the scanner 110. The scanner 110 is a flatbed type image scanner, and reads the document to generate image data. The printer 1 forms an image based on the image data on a sheet S.

The printer 1 includes a rectangular parallelepiped body housing 3. In the lower portion in the body housing 3, a sheet feeding cassette 4 which stores the sheet S and a sheet feeding roller 5 which feeds the sheet S rightward from the sheet feeding cassette 4 are provided. Above the sheet feeding cassette 4, an image forming unit 6 which forms a toner image by an electrophotographic method is provided, and a fixing device 7 which fixes the toner image to the sheet S is provided on the right upper side of the image forming unit 6. Above the fixing device 7, a discharge roller 8 which discharges the sheet S on which the toner image is fixed and a discharge tray 9 on which the discharged sheet S is stacked are provided.

Inside the body housing 3, a conveyance path 10 is provided from the sheet feeding roller 5 to the discharge roller 8 via the image forming unit 6 and the fixing device 7. The conveyance path 10 is formed by using plate-like members facing each other with a gap for passing the sheet S. A conveying roller 17 which holds and conveys the sheet S is provided at a plurality of positions on the conveyance path 10. A registration roller 18 is provided on the upstream side of the image forming unit 6 in the conveyance direction Y. On the right side of the fixing device 7, there is provided an inversion conveyance path 10R branched from the conveyance path 10 on the downstream side of the fixing device 7 in the conveyance direction Y and merging with the conveyance path 10 on the upstream side of the registration roller 18 in the conveyance direction Y.

The image forming unit 6 is provided with a photosensitive drum 11 whose potential is changed by irradiation with light, a charging device 12 which charges the photosensitive drum 11, an exposure device 13 which emits laser light corresponding to the image data, a developing device 14 which supplies toner to the photosensitive drum 11, an intermediate transfer unit 15 which transfers the toner image from the photosensitive drum 11 to the sheet S, and a cleaning device 16 which removes the toner remaining on the photosensitive drum 11. The intermediate transfer unit 15 includes an endless intermediate transfer belt 15B wound around a driving roller 15D and a driven roller 15N, a primary transfer roller 151 facing the inner circumferential surface of the intermediate transfer belt 15B at a position corresponding to the photosensitive drum 11 and generating a primary transfer bias, and a secondary transfer roller 152 facing the outer circumferential surface of the intermediate transfer belt 15B at a position corresponding to the driving roller 15D and generating a secondary transfer bias. A toner container 20 for supplying the toner to the developing device 14 is connected to the developing device 14.

The image forming unit 6 includes four sets of the photosensitive drum 11, the charging device 12, the exposure device 13, the developing device 14, the primary transfer roller 151, the cleaning device 16, and the toner container 20, and forms a color image by superposing the toner images of four colors on the intermediate transfer belt 15B. The present disclosure may be applied to the image forming apparatus 100 for forming a color image with toner of three or less colors or five or more colors.

The control part 2 includes an arithmetic part and a storage part. The arithmetic part is, for example, a CPU (Central Processing Unit). The storage unit includes a storage medium such as a ROM (Read Only Memory), a RAM (Random Access Memory), and an EEPROM (Electrically Erasable Programmable Read Only Memory). The arithmetic part reads and executes the control program stored in the storage part to perform various processes. The control part 2 may be realized only by an integrated circuit without using software.

A display operation part (not shown) is provided on the front side of the scanner 110. The display operation part includes a display panel, a touch panel provided superposed on the display surface of the display panel, and a keypad adjacent to the display panel. The control part 2 displays a screen indicating the operation menu, status, and the like of the printer 1 and the scanner 110 on the display panel, and controls the respective parts of the printer 1 and the scanner 110 according to the operation detected by the touch panel and the keypad.

The basic image forming operation of the printer 1 is as follows. When a print job of single-sided printing is inputted to the printer 1 from the display operation part or an external computer, the sheet feeding roller 5 feeds the sheet S from the sheet feeding cassette 4 to the conveyance path 10, the registration roller 18 whose rotation stopped corrects the skew of the sheet S, and the registration roller 18 sends the sheet S to the image forming unit 6 at a predetermined timing. In the image forming unit 6, the charging device 12 charges the photosensitive drum 11 to a predetermined potential, the exposure device 13 writes an electrostatic latent image on the photosensitive drum 11, the developing device 14 develops the electrostatic latent image using the toner supplied from the toner container 20 to form the toner image, the primary transfer roller 151 transfers the toner image to the intermediate transfer belt 15B, and the secondary transfer roller 152 transfers the toner image to the sheet S. Then, the fixing device 7 fixes the toner image to the sheet S by melting the toner image while holding and conveying the sheet S, and the discharge roller 8 discharges the sheet S to the discharge tray 9. The cleaning device 16 removes the toner remaining on the photosensitive drum 11. In the case of double-sided printing, the sheet S having the toner image fixed on the first surface is fed into the conveyance path 10 via the inversion conveyance path 10R, then the toner image is transferred to the second surface.

Figure 2:
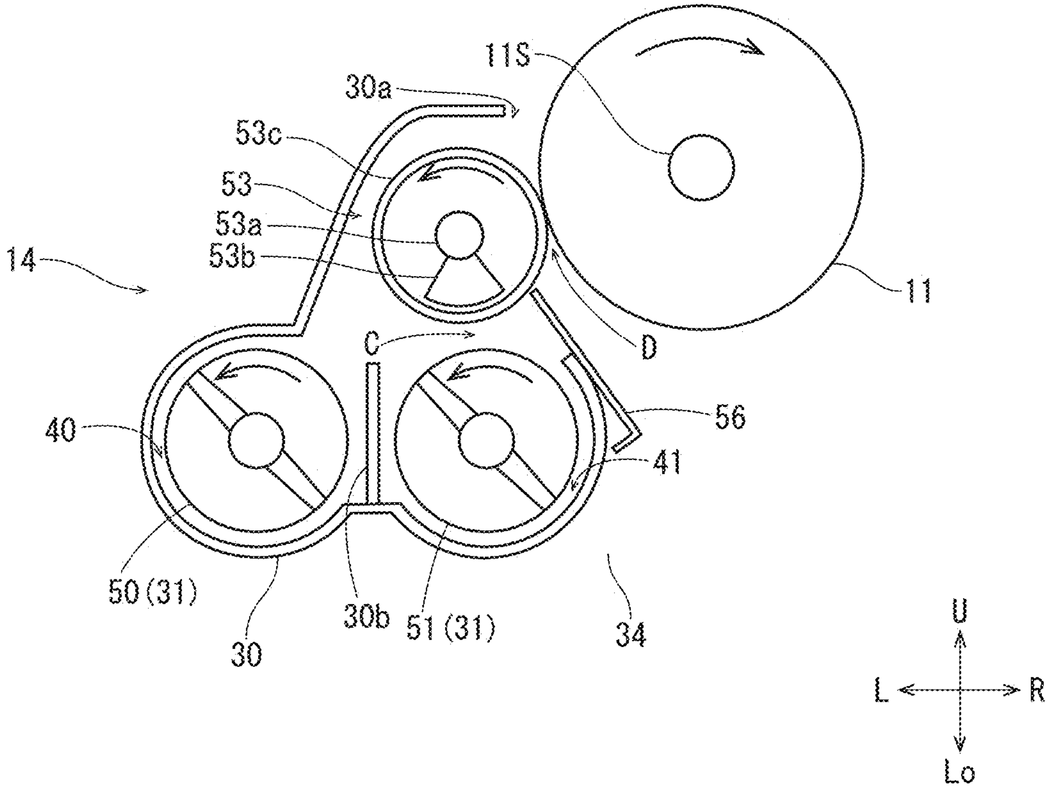
FIG. 2 is a front view schematically showing an internal configuration of a developing device according to the embodiment of the present disclosure.
Figure 3:
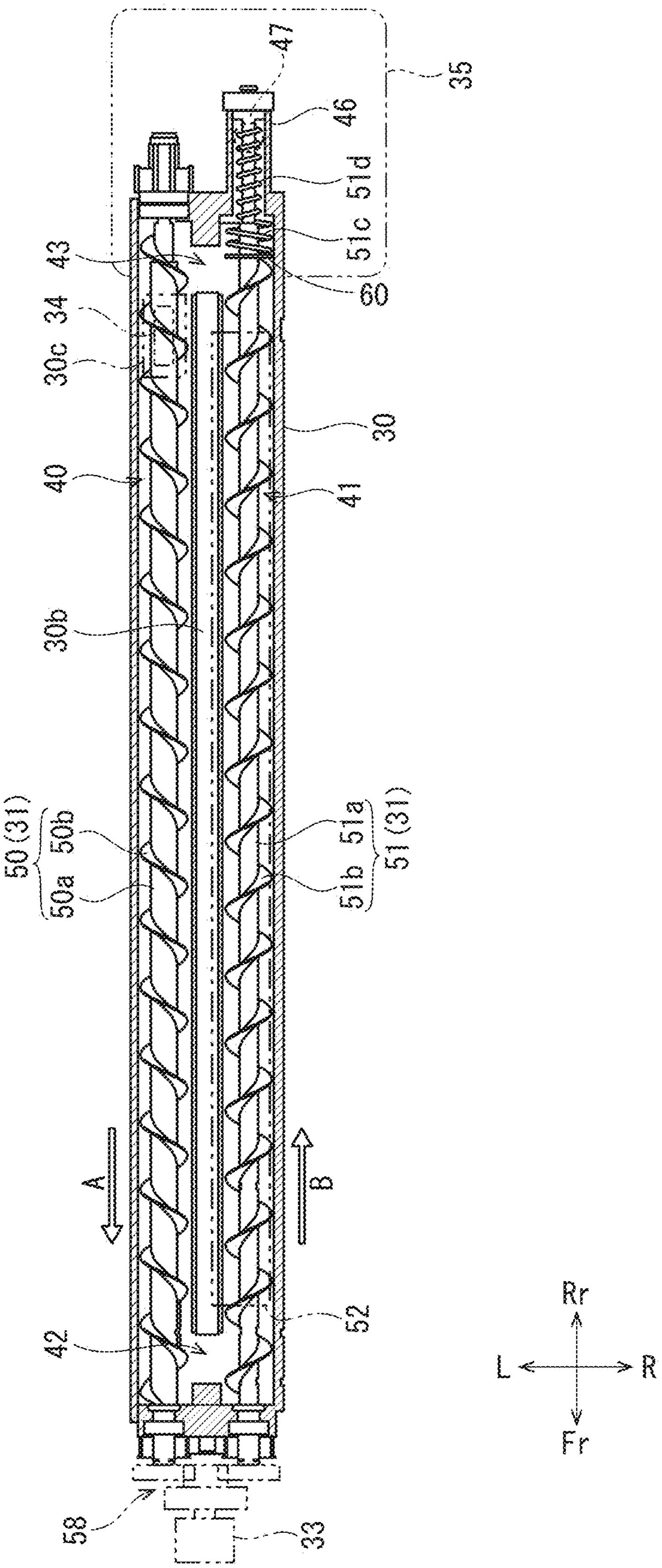
FIG. 3 is a cross-sectional view showing an internal configuration of a first conveying chamber and a second conveying chamber according to the embodiment of the present disclosure.
Figure 4:
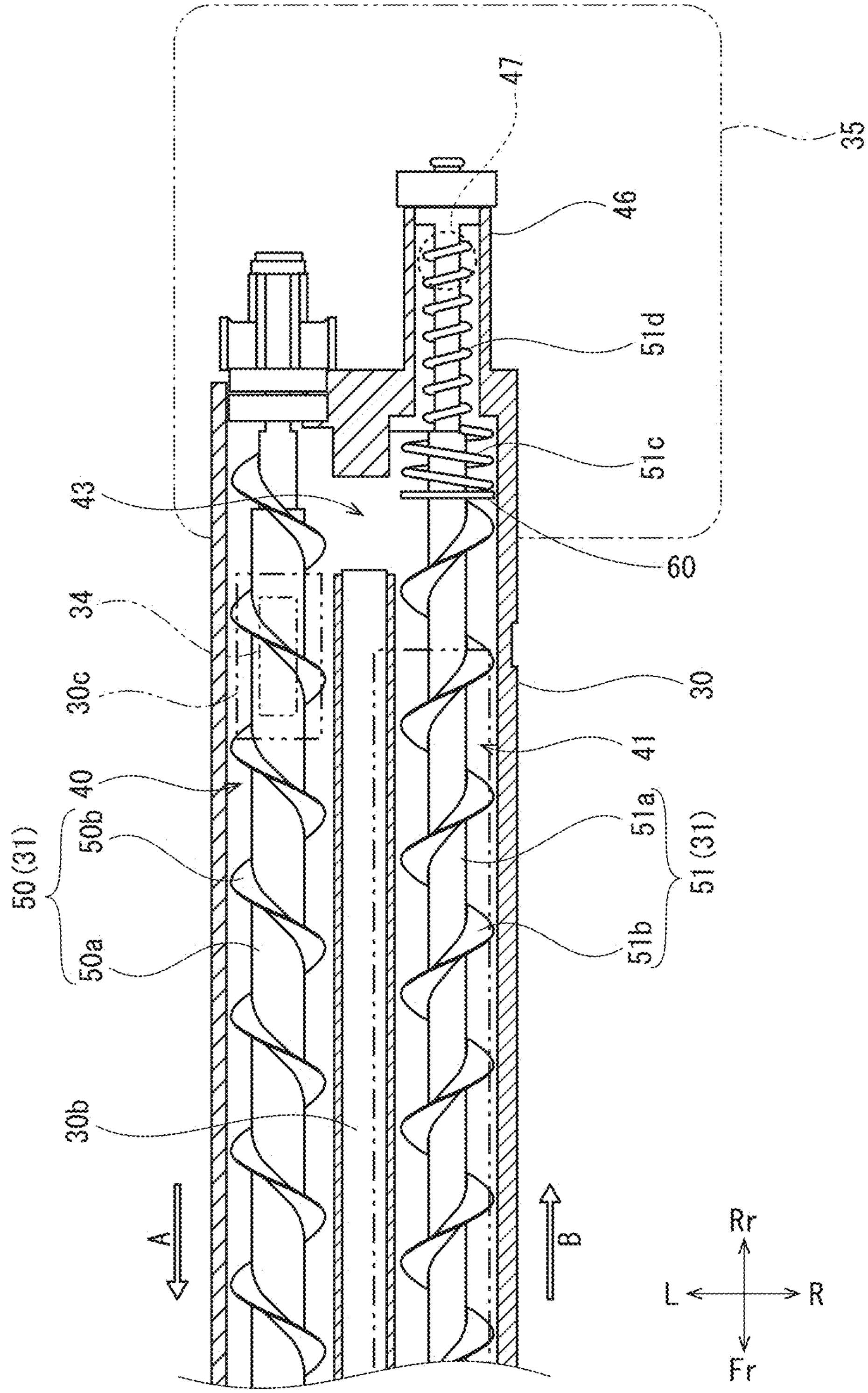
FIG. 4 is an enlarged cross-sectional view showing the rear portions of the first conveying chamber and the second conveying chamber according to the embodiment of the present disclosure.

[Developing Device] Next, the developing device 14 will be described. FIG. 2 is a front view schematically showing an internal configuration of the developing device 14. FIG. 3 is a cross-sectional view showing the internal configuration of a first conveying chamber 40 and a second conveying chamber 41. FIG. 4 is an enlarged cross-sectional view showing the rear portions of the first conveying chamber 40 and the second conveying chamber 41.

The four developing devices 14 have the same configuration. The developing device 14 (see FIG. 2 and FIG. 3) includes a housing 30, a stirring member 31, a developing roller 53, and a driving device 33. The housing 30 houses a developer containing the toner and carrier. The stirring member 31 stirs the developer in the housing 30 while conveying the developer. The developing roller 53 conveys the developer in the housing 30 from the stirring member 31 toward the photosensitive drum 11. The driving device 33 rotates the stirring member 31 and the developing roller 53.

[Housing] The housing 30 is made of, for example, resin material. The housing 30 is formed elongated in the front-and-rear direction. An opening 30*a* (see FIG. 2) is formed on the upper right side surface of the housing 30. A partition wall 30*b* (see FIG. 2 to FIG. 4) is provided on the inner bottom of the housing 30 along the longitudinal direction of the housing 30. The partition wall 30*b* partitions the internal space of the housing 30 into a first conveying chamber 40 and a second conveying chamber 41. The first conveying chamber 40 and the second conveying chamber 41 are provided in parallel to each other.

A communication portion 42 (see FIG. 3) for communicating the first conveying chamber 40 and the second conveying chamber 41 is formed at the front end portion of the partition wall 30*b*. A communication portion 43 for communicating the first conveying chamber 40 and the second conveying chamber 41 is formed at the rear end portion of the partition wall 30*b*.

A replenishment port 30*c* (see FIG. 3 and FIG. 4) through which the toner is supplied from the toner container 20 to the first conveying chamber 40 is formed in the housing 30. The replenishment port 30*c* is provided in the vicinity of the communication portion 43.

A discharge case 46 (see FIG. 3 and FIG. 4) is provided on the rear side of the second conveying chamber 41. A discharge port 47 is formed on the lower surface of the discharge case 46. A collection bottle 35 for storing the discharged developer is connected to the discharge port 47.

[Stirring Member] The stirring member 31 (see FIG. 2 and FIG. 3) includes a first stirring member 50 arranged along the first conveying chamber 40 and a second stirring member 51 arranged along the second conveying chamber 41.

The first stirring member 50 and the second stirring member 51 (see FIG. 3 and FIG. 4) are formed by providing spiral blades 50*b* and 51*b* on the circumferential surfaces of rotational shaft portions 50*a* and 51*a*, respectively. The first stirring member 50 and the second stirring member 51 are supported by the housing 30 via the rotational shaft portions 50*a* and 51*a*, respectively, and rotate in the counterclockwise direction in FIG. 2. The spiral blades 50*b* and 51*b* are formed at the same pitch and in opposite winding directions. The first stirring member 50 conveys the developer in the direction A (see FIG. 3 and FIG. 4), and the second stirring member 51 conveys the developer in the direction B.

The second stirring member 51 (see FIG. 3 and FIG. 4) is provided with a reverse spiral blade 51*c* on the rear side of the spiral blade 51*b* and a discharge blade 51*d* on the rear side of the reverse spiral blade 51*c*. The reverse spiral blade 51*c* is disposed at the rear end portion in the second conveying chamber. The reverse spiral blade 51*c* is formed spirally in a winding direction opposite to that of the spiral blade 51*b*. The discharge blade 51*d* is disposed in the discharge case 46, and is formed spirally in the same winding direction as the spiral blade 51*b*.

[Developing Roller] The developing roller 53 (see FIG. 2) is disposed above the second stirring member 51. The developing roller 53 has a fixed shaft portion 53*a*, a magnetic pole member 53*b*, and a developing sleeve 53*c*. The fixed shaft portion 53*a* is supported by the housing 30, and is not rotatable. The developing sleeve 53*c* is made of non-magnetic material, is formed in a cylindrical shape and covers the magnetic pole member 53*b*. The developing sleeve 53*c* has a gap with the magnetic pole member 53*b*, is supported by the fixed shaft portion 53*a*, and rotates in the counterclockwise direction in FIG. 2.

The developing roller 53 is exposed through the opening 30*a* of the housing 30, and faces the photosensitive drum 11. The developing roller 53 is electrically connected to a developing bias power source (not shown). The developing bias power supply applies a developing bias obtained by superimposing a DC voltage and an AC voltage to the developing roller 53.

A layer thickness regulating blade 56 is provided in the opening 30*a* of the housing 30. When a region where the developing roller 53 and the second stirring member 51 are closest to each other is defined as a closest region C and a region where the developing roller 53 and the photosensitive drum 11 are closest to each other is defined as a closest region D, the tip of the layer thickness regulating blade 56 faces the developing sleeve 53*c* on the downstream side of the closest region C and on the upstream side of the closest region D in the rotational direction of the developing roller 53. The layer thickness regulating blade 56 has a gap with the outer circumferential surface of the developing sleeve 53*c*. The layer thickness regulating blade 56 regulates a layer thickness of a magnetic brush formed on the outer circumferential surface of the developing sleeve 53*c*.

The driving device 33 (see FIG. 3) is an electric motor for transmitting a driving force to the first stirring member 50, the second stirring member 51, and the developing roller 53 via a gear train 58. When the driving device 33 is driven, the first stirring member 50, the second stirring member 51 and the developing roller 53 are rotated.

Figure 5:
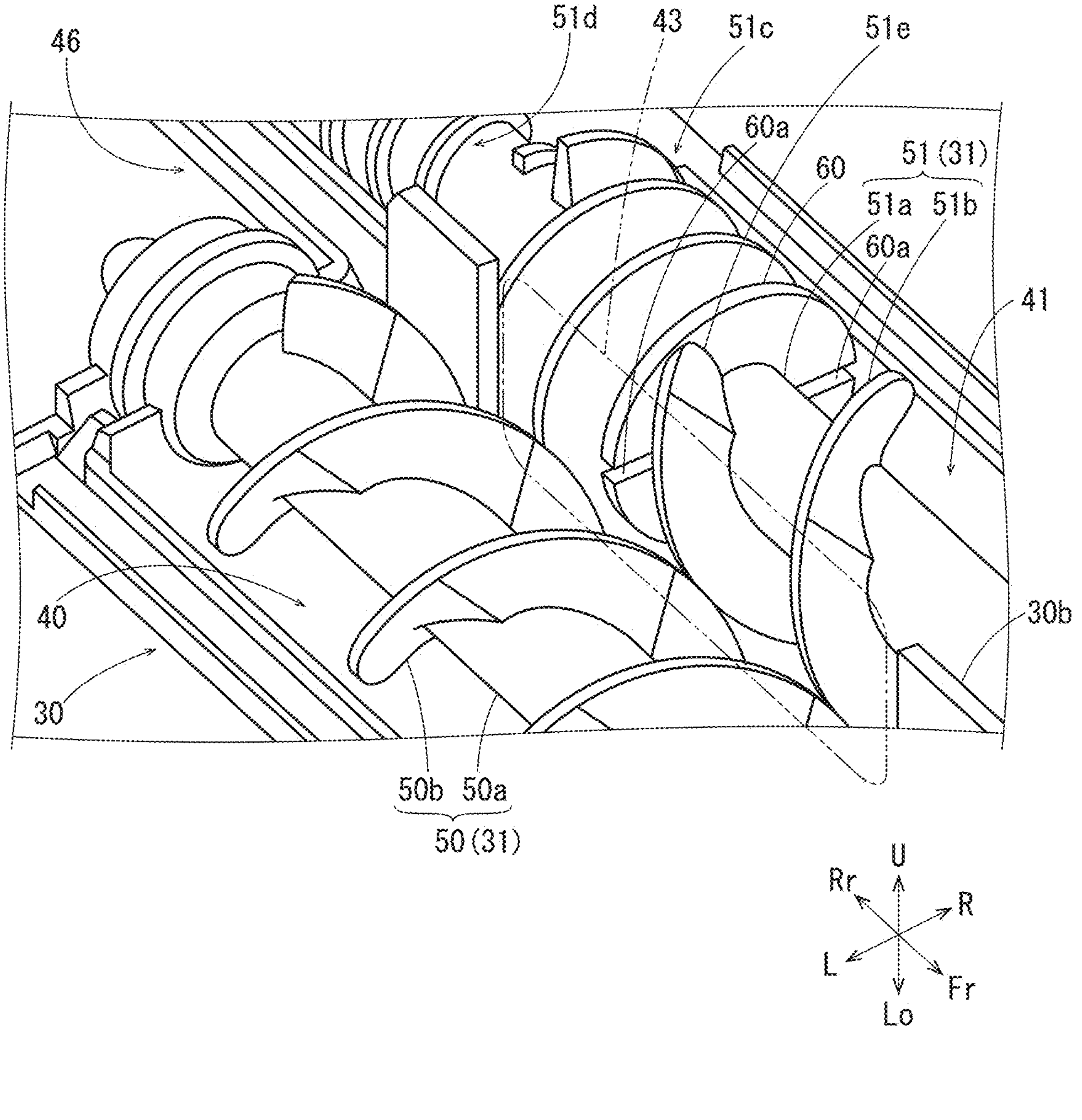
FIG. 5 is a perspective view showing the rear portions of the first conveying chamber and the second conveying chamber according to the embodiment of the present disclosure.
Figure 6:
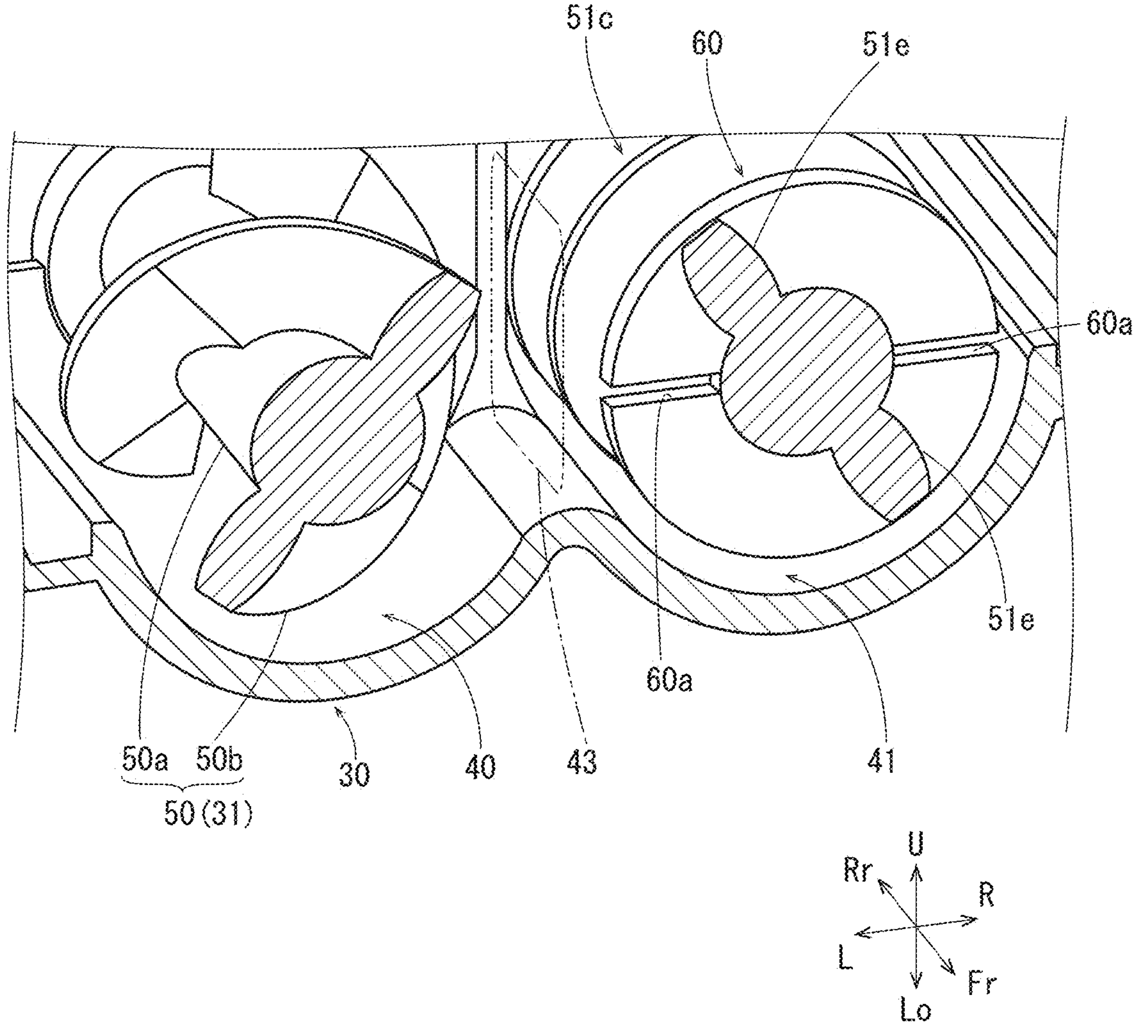
FIG. 6 is a perspective view showing a cross-section of the rear portions of the first conveying chamber and the second conveying chamber according to the embodiment of the present disclosure.

[Regulating Member] FIG. 5 is a perspective view showing the rear portions of the first conveying chamber 40 and the second conveying chamber 41. FIG. 6 is a perspective view showing cross-sections of the rear portions of the first conveying chamber 40 and the second conveying chamber 41.

The regulating member 60 is provided between the spiral blade 51*b* and the reverse spiral blade 51*c* of the second stirring member 51. The regulating member 60 regulates the conveyance of the developer to the discharge port 47. The regulating member 60 is a disk-shaped member. The regulating member 60 is provided on the rotational shaft portion 51*a* of the second stirring member 51. The center of the rotational shaft portion 51*a* coincides with the center of the regulating member 60. The regulating member 60 rotates together with the rotational shaft portion 51*a* and the spiral blade 51*b*.

The regulating member 60 has a lack portion 60*a* penetrating in the conveyance direction (the direction B in FIG. 4). The lack portion 60*a* is a slit formed along the radial direction. The lack portion 60*a* is provided at a position circumferentially spaced from the downstream end portion 51*e* of the spiral blade 51*b* in the conveyance direction (the direction B).

Next, the operation of conveying and stirring the developer by the developing device 14 will be described. The developer supplied from the toner container 20 to the housing 30 through the replenishment port 30*c* (see FIG. 3 and FIG. 4) is conveyed in the direction A in the first conveying chamber 40 by the first stirring member 50, moved to the second conveying chamber 41 through the communication portion 42, and conveyed in the direction B by the second stirring member 51. The developer conveyed in the direction B is blocked by the regulating member 60 and moves mainly in three flows.

That is, the developer moves in the flow to the communication portion 43, the flow passing over the regulating member 60, and the flow through the lack portion 60*a*. Among them, the developer flowing to the communication portion 43 flows to the first conveying chamber 40, and the stirring and conveying are continued.

On the other hand, the developer passing over the regulating member 60 is mainly divided into two flows. A part of the developer passed over the regulating member 60 is pushed back by the reverse spiral blade 51*c* and flows to the first conveying chamber 40 through the communication portion 43. The other developer passes over the reverse spiral blade 51*c*, is conveyed in the direction B by the discharge blade 51*d*, and is discharged from the discharge port 47 as the excessive developer.

On the other hand, the developer passed through the lack portion 60*a* is pushed back by the reverse spiral blade 51*c* and flows to the first conveying chamber 40 through the communication portion 43. That is, a discharge amount of the excessive developer varies depending on an amount of the developer passing through the lack portion 60*a*.

For example, in order to increase a discharge amount of the excessive developer, an amount of the developer passing through the lack portion 60*a* may be reduced. For example, by reducing a number of the lack portion 60*a* or reducing a size of the lack portion 60*a*, an amount of the developer passing through the lack portion 60*a* is reduced.

An amount of the developer passing through the lack portion 60*a* also varies depending on a circumferential position of the lack portion 60*a*. If the lack portion 60*a* is adjacent to the downstream end portion 51*e* of the spiral blade 51*b* in the conveyance direction (the direction B), the developer flows directly into the lack portion 60*a* from the end portion 51*e*, and an amount of the developer passing through the lack portion 60*a* increases. On the other hand, when the lack portion 60*a* is circumferentially separated from the end portion 51*e*, the developer is temporarily blocked by the regulating member 60. Since a part of the developer passes over the regulating member 60 during the blocking, an amount of the developer passing through the lack portion 60*a* is reduced. The longer the distance between the lack portion 60*a* and the end portion 51*e*, the longer the time for blocking the developer, and therefore, the greater the amount of developer passing over the regulating member 60, and the smaller the amount of developer passing through the lack portion 60*a*.

For example, when two types of image forming apparatuses 100 having different processing speeds are designed, the high-speed apparatus consumes more toner per unit time than the low-speed apparatus, so that an amount of the carriers remaining in the housing 30 also increases. Therefore, the high-speed apparatus needs to increase a discharge amount of the excessive developer per unit time. According to the present embodiment, a discharge amount of the excessive developer varies depending on the number, size, and position of the lack portion 60*a*. Therefore, according to the present embodiment, a discharge amount of the excessive developer can be optimized without changing the size of the developing device 14.

The developing device 14 according to the present embodiment described above includes the housing 30 which stores the developer, the replenishment port 30*c* through which the developer is supplied to the housing 30, the spiral blade 51*b* which stirs the developer in the housing 30 while conveying the developer in the predetermined conveyance direction (the direction B), the discharge port 47 through which the developer conveyed by the spiral blade 51*b* is discharged, and the regulating member 60 which is provided between the spiral blade 51*b* and the discharge port 47 and regulates the conveyance of the developer to the discharge port 47, wherein the regulating member 60 has the lack portion 60*a* penetrating in the conveyance direction (the direction B). According to this configuration, since a discharge amount of the excessive developer varies depending on a number and a size of the lack portion 60*a*, a discharge amount of the excessive developer can be optimized without changing the size of the developing device 14.

Further, according to the developing device 14 according to the present embodiment, the lack portion 60*a* is circumferentially separated from the downstream end portion 51*e* of the spiral blade 51*b* in the conveyance direction (the direction B). According to this configuration, since a discharge amount of the excessive developer varies depending on the distance between the lack portion 60*a* and the downstream end portion 51*e* of the spiral blade 51*b* in the conveyance direction (the direction B), a discharge amount of the excessive developer can be optimized without changing the size of the developing device 14.

Further, according to the developing device 14 according to the present embodiment, the lack portion 60*a* is a slit formed along the radial direction. According to this configuration, since the lack portion 60*a* is formed by attaching the two semicircular plates facing each other to the rotational shaft portion 51*a*, the lack portion 60*a* can be formed with a simple configuration.

Further, the image forming apparatus 100 according to the present embodiment includes the photosensitive drum 11 on which an electrostatic latent image is formed, and the developing device 14 which supplies the developer to the photosensitive drum 11. According to this configuration, the image can be formed with accurate density.

The above embodiment may be modified as follows.

In the above embodiment, the regulating member 60 is provided between the spiral blade 51*b* and the reverse spiral blade 51*c*, but the reverse spiral blade 51*c* may have the function of the regulating member 60. For example, the lack portion 60*a* may be provided in the forwardmost portion (on a side of the spiral blade 51*b*) of the reverse spiral blade 51*c*. With this configuration, a discharge amount of the excessive developer can be optimized without changing the size of the developing device 14. Also, a number of components can be suppressed.

In the above embodiment, the lack portion 60*a* of the regulating member 60 is a slit formed along the radial direction, but the lack portion 60*a* may have another shape. For example, the lack portion 60*a* may be a hole, and the shape of the hole may be circular or polygonal.

The invention claimed is:

1. A developing device comprising:

a housing which houses a developer, a replenishment port through which the developer is replenished to the housing;

a spiral blade which stirs the developer in the housing while conveying the developer in a predetermined conveyance direction;

a discharge port through which the developer conveyed by the spiral blade is discharged;

a circular regulating member which is disposed between a downstream end portion of the spiral blade in the conveyance direction and the discharge port, and regulates a conveyance of the developer to the discharge port; and a rotational shaft portion provided with the circular regulating member and the spiral blade, in which a center of the rotational shaft portion coincides with a center of the circular regulating member; and a reverse spiral blade provided between the circular regulating member and the discharge port on the rotational shaft portion, spirally formed in a winding direction opposite to that of the spiral blade, and conveying the developer in a direction opposite to the conveyance direction, wherein the circular regulating member has a lack portion penetrating in the conveyance direction, the lack portion is a slit formed along a radial direction of the rotational shaft portion and is separated from the downstream end portion of the spiral blade in a circumferential direction of the rotational shaft portion, a part of the developer conveyed along the conveyance direction and passing over the circular regulating member is discharged from the discharge port, while the developer passing through the lack portion is pushed back by the reverse spiral blade and is not conveyed to the discharge port, the smaller an amount of the developer passing through the lack portion, the larger a discharge amount of the excessive developer discharged through the discharge port, and the longer a distance between the lack portion and the downstream end portion of the spiral blade along the circumferential direction of the rotational shaft portion, the smaller an amount of the developer passing through the lack portion.

2. The developing device according to claim 1, wherein the lack portion is formed by attaching two semicircular plates facing each other to the rotational shaft portion.

3. An image forming apparatus comprising:

a photosensitive drum on which an electrostatic latent image is formed; and the developing device according to claim 1, which supplies the developer to the photosensitive drum.

* * * * *